United States Patent
Kotani et al.

(10) Patent No.: US 6,833,208 B2
(45) Date of Patent: Dec. 21, 2004

(54) FUEL CELL SYSTEM

(75) Inventors: Yasunori Kotani, Saitama (JP);
Kiyoshi Kasahara, Saitama (JP);
Hikaru Okada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 483 days.

(21) Appl. No.: 09/985,931

(22) Filed: Nov. 6, 2001

(65) Prior Publication Data

US 2002/0061425 A1 May 23, 2002

(30) Foreign Application Priority Data

Nov. 6, 2000 (JP) ........................................ 2000-336820

(51) Int. Cl.[7] ............................. H01M 8/10; H01M 8/04
(52) U.S. Cl. ........................................... 429/20; 429/24
(58) Field of Search ............................ 429/19, 20, 24

(56) References Cited

U.S. PATENT DOCUMENTS 6,165,633 A * 12/2000 Negishi ........................ 429/17
6,638,653 B2 * 10/2003 Andou et al. .................. 429/20

FOREIGN PATENT DOCUMENTS

JP          2000-340246       * 12/2000

* cited by examiner

Primary Examiner—Patrick Ryan
Assistant Examiner—Thomas H. Parsons
(74) Attorney, Agent, or Firm—Arent Fox PLLC

(57) ABSTRACT

Air for reforming used in the reformation reaction in a reformer 3 of a fuel cell system FCS is supplied into an evaporator 2. In the evaporator 2, raw fuel liquid is evaporated to produce raw fuel gas. The reforming air and the raw fuel gas are well admixed within the evaporator 2 and a conduit 8C connecting the evaporator 2 to the reformer 3. At the starting of the fuel cell system FCS, a large amount of the air is introduced into the evaporator 2 via an air inlet port 14B for starting. The fuel cell system having such a configuration can appropriately mix the fuel gas in the reformer with the reforming air and can rapidly operate the evaporator and the reformer at the time of starting without enlarging the total size of the fuel cell system.

10 Claims, 7 Drawing Sheets

FUEL CELL SYSTEM

BACKGROUND ARTS

1. Field of the Invention

The present invention relates to a reformation type fuel cell system, which reforms a fuel such as methanol into a hydrogen-enriched fuel gas and takes it, and particularly to a fuel cell system suitable as a power source for an electric vehicle.

2. Description of Related Arts

In recent years, various electric vehicles have been developed having a driving motor carried thereon instead of an engine. As one of such types of vehicles, development of a vehicle (hereinafter referred to as "fuel cell electric vehicle") having a fuel cell system as a power source for the driving motor carried thereon has been sharply made. A so-called reformation type fuel cell system has been known as one of such fuel cell systems.

An example of the reformation type fuel cell system for use in the fuel cell vehicle will be described with reference to FIG. 7. A fuel cell system 50 depicted on FIG. 7 has a fuel cell 51, in which a hydrogen-enriched gas is supplied to an anode side thereof and air serving as an oxidant gas is supplied to a cathode side thereof to thereby generate electric power. The fuel cell system 50 also has an evaporator 52 which evaporates raw fuel liquid such as water/methanol mixed liquid to form raw fuel gas. To the evaporator 52 is connected a storage tank T for the water/methanol mixed liquid via a pump P, and the raw fuel liquid comprising the water/methanol mixed liquid is supplied to the evaporator 52 by the actuation of the pump P. The raw fuel gas obtained by the evaporation of the raw fuel liquid by means of the evaporator 52 is supplied to a reformer 53. In the reformer 53, the raw fuel gas undergoes a catalytic reformation reaction such as an automatic thermal reaction to produce hydrogen enriched fuel gas. The fuel gas produced in the reformer 53 is supplied to a CO remover 54 at which carbon monoxide by-product produced in the course of the reforming reaction, which is harmful for the fuel cell 51, is removed. The fuel gas from which carbon monoxide is removed by means of the CO remover 54 is then supplied to the anode side of the fuel cell 51. The fuel cell system 50 also has an air compressor 551 and by means of the air compressor 55, the air as the oxidant gas is supplied to the cathode side of the fuel cell 51. The air compressor 55 supplies the air as reforming air required for the reforming reaction (hereinafter referred to as "reforming air") to the reformer 53.

In the case where the fuel cell electric vehicle having the fuel cell system 50 carried thereon, which has been stopped, is started, the evaporator 52, the reformer 53, and the like are usually cooled. For this reason, in order to exhibit prescribed performances possessed by the evaporator 52 and the reformer 53, a prescribed degree of heat is required for heating them. For this reason, a combustion burner 56 for starting (hereinafter referred to as "starting combustion burner) which heats the evaporator 52 and a starting combustion burner 57 for heating the reformer 53 are provided on the conventional fuel cell system 50. After the catalyst layer of the evaporator 52 and the reforming catalyst of the reformer 53 are heated up to prescribed temperatures respectively by means of the combustion burners 56 and 57 for starting, the raw fuel liquid is supplied and the reforming air is supplied in the conventional fuel cell system 50.

Since the reforming air is directly introduced into the reformer 53 in the conventional fuel cell system 50, in some cases, the reforming air is not introduced into the reformer 53 in a uniform manner. In this case, differences in the density of the reforming air occurs in the reformer 53, changing the admixture of the raw fuel gas with the reforming air for the worse, which is apt to cause uneven temperatures on the surfaces of the reforming catalyst provided within the reformer 53. Typically, the temperature of the reforming catalyst becomes higher at the portion where the reforming air is concentrated, while the temperature of the reforming catalyst becomes lower at the portion where the reforming catalyst is diluted. Specifically, the oxidation represented by the formula (1), which is an exothermic reaction is accelerated on the portion where the reforming air is concentrated, and due to the heat generated at this time, the temperature of the reforming catalyst is increased.

$$CH_3OH + 3/2O_2 \rightarrow 2H_2O + CO_2 \tag{1}$$

On the other hand, a steam reforming reaction represented by the following formula (2), which is an endothermic reaction, is promoted on the portion where the reforming air is diluted, and the temperature of the reforming catalyst is decreased due to the endothermic reaction.

$$CH_3OH + H_2O \rightarrow 3H_2 + CO_2 \tag{2}$$

For this reason, the temperature difference in the reforming catalyst occurs. FIG. 8 shows the relation between the concentration of carbon monoxide in the fuel gas and the temperature of the reforming catalyst. It can be proven from this figure that if the temperature of the reforming catalyst is low, an amount of the total hydrocarbons (THC) becomes unduly high, meaning that the raw fuel gas is passed through with no or insufficient reformation, and the CO concentration becomes low, while THC is decreased according to the increasing of the temperature of the reforming catalyst and the CO concentration has a tendency to be increased. Consequently, with such uneven temperatures of the surfaces of the reforming catalyst, there arises a problem that the raw fuel gas is passed through with no or insufficient reformation to be unreformed fuel gas on the portion where the temperature of the reforming catalyst is low, while the CO concentration becomes high at which the temperature of the reforming catalyst is high. If the amount of unreformed gas is increased, no sufficient amount of hydrogen can be obtained, considering that the power generation in the fuel cell system 51 sometimes has a trouble. On the other hand, if the CO concentration is high, there is a fear of poisoning the fuel cell system 51 with CO.

In order to solve such a problem as just mentioned, it could be considered that as shown in an ideal line of FIG. 7 a mixer 58 for mixing the raw fuel gas with the reforming air is separately disposed for the purpose of homogenizing the temperature distribution over the reforming catalyst. However, if such a mixer 58 is disposed, the fuel cell system 50 becomes large-scale, or the pressure loss of the total system becomes large, leading to poor system efficiency.

On the other hand, at the time of starting the conventional fuel cell system 50, two starting combustion burners, i.e., the starting combustion burner 56 for warming up the evaporator 52 and the starting combustion burner 57 for warming up the reformer 53, have been utilized. However, the use of many starting combustion burners as described above also leads to enlarge the size of the system, causing the problem of unsuitability for use in the fuel cell system for carrying a vehicle.

SUMMARY OF THE INVENTION

An object of the present invention is, therefore, to provide a fuel cell system which can appropriately mix the fuel gas in the reformer with the reforming air and which can rapidly operate the evaporator and the reformer at the time of starting the fuel cell system without enlarging the total size of the fuel cell system.

According to the present invention, which attains the object described above, there is provided a fuel cell system comprising:

a fuel cell in which fuel gas and oxidant gas are supplied to generate power;

an evaporator which evaporates raw fuel liquid by a combustion heat obtained by combusting exhaust gas exhausted from said fuel cell to provide raw fuel gas; and a reformer which reforms the raw fuel gas supplied from said evaporator to provide said fuel gas;

said fuel cell system further comprising:

at least one air introduction member which introduces air for use in the reforming reaction (reforming air) in said reformer;

the air introduced from said air introduction member being supplied from said evaporator to said reformer.

In the fuel cell system according to the present invention, the reforming air in the reformer is introduced in the evaporator. For this reason, the reforming air is admixed with the fuel cell in a pipe which communicates the evaporator with the reformer; thus, the fuel gas and the reforming air are admixed in a uniform manner. As a result, there is no uneven temperature of surfaces of the reforming catalyst, making it possible to prevent the fuel gas within the reformer from remaining unreformed and to prevent the increasing of the CO concentration. Furthermore, since the reforming air is well admixed with the fuel gas and, thus, no additional device such as a mixer is required to be disposed, the fuel cell system is not enlarged as a whole.

Furthermore, according to the fuel cell system of the present invention, air can be previously introduced into the evaporator prior to the supply of the raw fuel liquid at the time of starting the fuel cell system. The use of the air as a thermal medium makes it possible to rapidly warm up the evaporator. The air making use of warming up the evaporator is supplied to the reformer in the state where it remains hot. As a result, since the temperature of the reforming catalyst can be increased through the hot air, there is no need for disposing any starting combustion burner, promoting miniaturization of the fuel cell system as a whole.

In one preferred aspect of the fuel cell system of the present invention, a second air introduction member which introduces the air into the evaporator, at the time of starting the fuel cell system is preferably disposed.

Comparing the introduction of the air into the evaporator at the time of staring the fuel cell system with that at the time of normal operation except for the starting, a much larger amount of the air is required at the starting, because a large amount of the air serving as the thermal medium is required for rapid warming-up.

In contrast, at the normal operation, only a small amount of the air is required (for the reformation), while fine adjustment of the amount of the air is required depending upon the operating situation of the fuel cell system. Consequently, the air introduction member for introducing the air at the normal operation is used to introduce a large amount of air required at the starting only with difficulty, taking into the consideration of the configuration of the air introduction member. For this reason, according to the first preferred aspect of the present invention, the second air introduction member for the introduction of the air is separately disposed. (For the purpose of distinguishing from the second air introduction member, the air introduction member of the main configuration is sometimes referred to as "first air introduction member".) When the fuel cell system is started, the air is introduced both from the first air introduction member and the second air introduction member, whereby a large amount of the air required at the starting can be appropriately introduced.

In the first preferred aspect of the fuel cell system of the present invention, the second air introduction member is preferably configured so as to introduce the air into the evaporator in an amount larger than that of said first air introduction member.

In this preferred embodiment, the air can be introduced into the evaporator from the second air introduction member at starting the fuel cell system, and from the first air introduction member at the normal operation. Accordingly, the first and the second air introduction members may be simply configured, and may be controlled easily.

According to the second preferred aspect of the fuel cell system of the present invention, before the raw fuel gas is introduced into the evaporator and after the air introduction from the air introduction member is started, the raw fuel liquid is preferably supplied to the evaporator when at least one of a signal for the evaporator temperature based on the temperature of the evaporator and a signal for the temperature of the reforming catalyst based on the temperature of the reforming catalyst exceeds a prescribed level.

According to the third preferred aspect of the fuel evaporator of the present invention, in the first preferred aspect, it is preferred that before the raw fuel gas is introduced into the evaporator and after the air introduction from the second air introduction member is started, air introduction from the second air introduction member is stopped when at least one of a signal for the evaporator temperature based on the temperature of the evaporator and a signal for the temperature of the reforming catalyst based on the temperature of the reforming catalyst exceeds a prescribed level, and the raw fuel liquid is supplied to the evaporator.

In the second and third preferred aspects of the present invention, the raw fuel liquid is supplied to the evaporator when either or both of a signal for the evaporator temperature based on the temperature of the evaporator and a signal for the temperature of the reforming catalyst based on the temperature of the reforming catalyst exceeds a prescribed level. For this reason, after the situations for reforming the fuel in the fuel cell system have been ready, the raw fuel liquid is supplied to the evaporator to surely start the production of the fuel gas.

Also, according to the present invention, there is provided a fuel cell system comprising: a fuel cell in which fuel gas and oxidant gas are supplied to generate power; an evaporator which evaporates raw fuel liquid by a combustion heat obtained by combusting exhaust gas exhausted from said fuel cell to provide raw fuel gas; and a reformer which reforms the raw fuel gas supplied from said evaporator to provide said fuel gas; said fuel cell system having a configuration that at the time of starting said fuel cell system, air is introduced into said evaporator in an amount larger than that at the time of the normal operation, and the larger amount of the air and the raw fuel liquid are admixed with each other in said evaporator, after which the air having been utilized for warming up said evaporator is transferred to said reformer.

According to this configuration, the air can be previously introduced into the evaporator prior to the supply of the raw fuel liquid at starting the fuel cell system. The use of the air as a thermal medium makes it possible to rapidly warm up the evaporator. The air making use of warming up the evaporator is supplied to the reformer in the state where it remains warm. As a result, since the temperature of the reforming catalyst can be increased through the hot air, there is no need for disposing any starting combustion burner, promoting miniaturization of the fuel cell system as a whole.

DESCRIPTION OF THE PREFERRED EMBODIMENTS

Referring to the accompanying drawings, embodiments of the present invention will now be described specifically.

Figure 1:
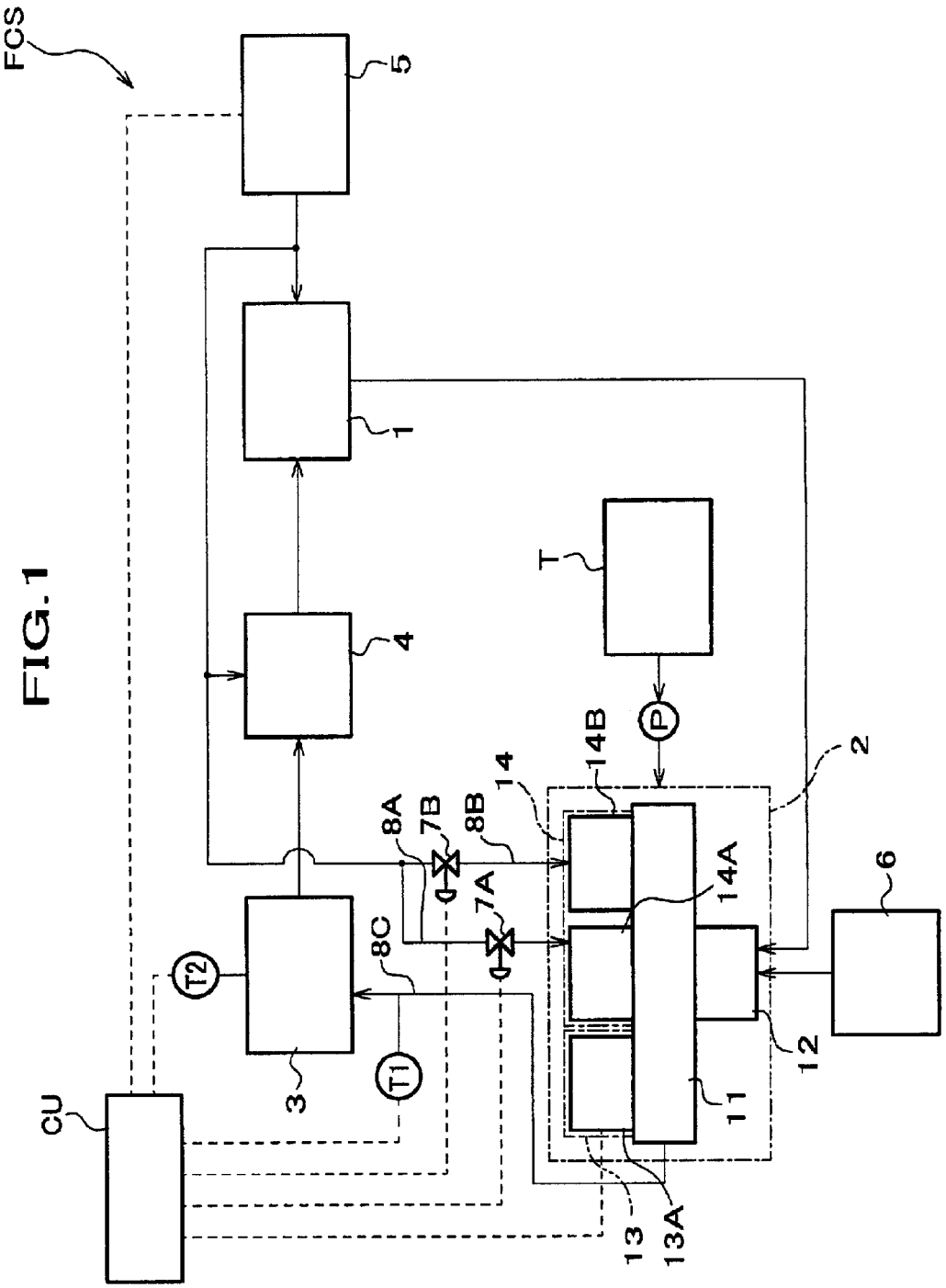
FIG. 1 shows a configuration of the fuel cell system according to the present invention.

FIG. 1 shows a configuration of the fuel cell system according to the present invention. As shown in FIG. 1, the fuel cell system FCS according to the present invention is to be carried on a fuel cell electric vehicle, and possesses a fuel cell 1, an evaporator 2, a reformer 3, a CO remover 4, an air compressor 5, and a starting combustion burner 6.

The fuel cell 1 has a configuration having a plurality of cell laminated cells, and the fuel cell 1 is divided into the anode side, into which the fuel gas is supplied, and the cathode side, into which air as the oxidant gas is supplied, by means of these cells. From the fuel gas supplied into the anode side and the oxidant gas supplied into the cathode side, electricity is generated in each cell.

The evaporator 2 possesses a body 11 of the evaporator, a catalytic combustor 12, a raw fuel-injecting apparatus 13, and an air introduction member 14. To the raw fuel-injecting apparatus 13 is connected a storage tank T (hereinafter simply referred to as "tank") for the water/methanol mixed liquid in which the raw fuel liquid such as the water/methanol mixed liquid are stored. The raw fuel liquid is supplied from the tank T via a pump P to the raw fuel-injecting apparatus 13. The raw fuel liquid supplied to the raw fuel-injecting apparatus 13 is injected at and supplied to the body 11 of the evaporator. At this time, a flow amount of the raw fuel liquid to be supplied to the body 11 of the evaporator is regulated by an injection amount injected by the raw fuel-injecting apparatus 13. The catalytic combustor 12 is disposed at a lower portion of the body of the evaporator. Off gas, which is an exhaust gas exhaust from the fuel cell 1, is introduced into the catalytic combustor 12, at which the off gas is combusted to produce heat. Due to the heat thus produced in the catalytic combustor 12, the raw fuel liquid within the body 11 of the evaporator is evaporated.

Figure 2:
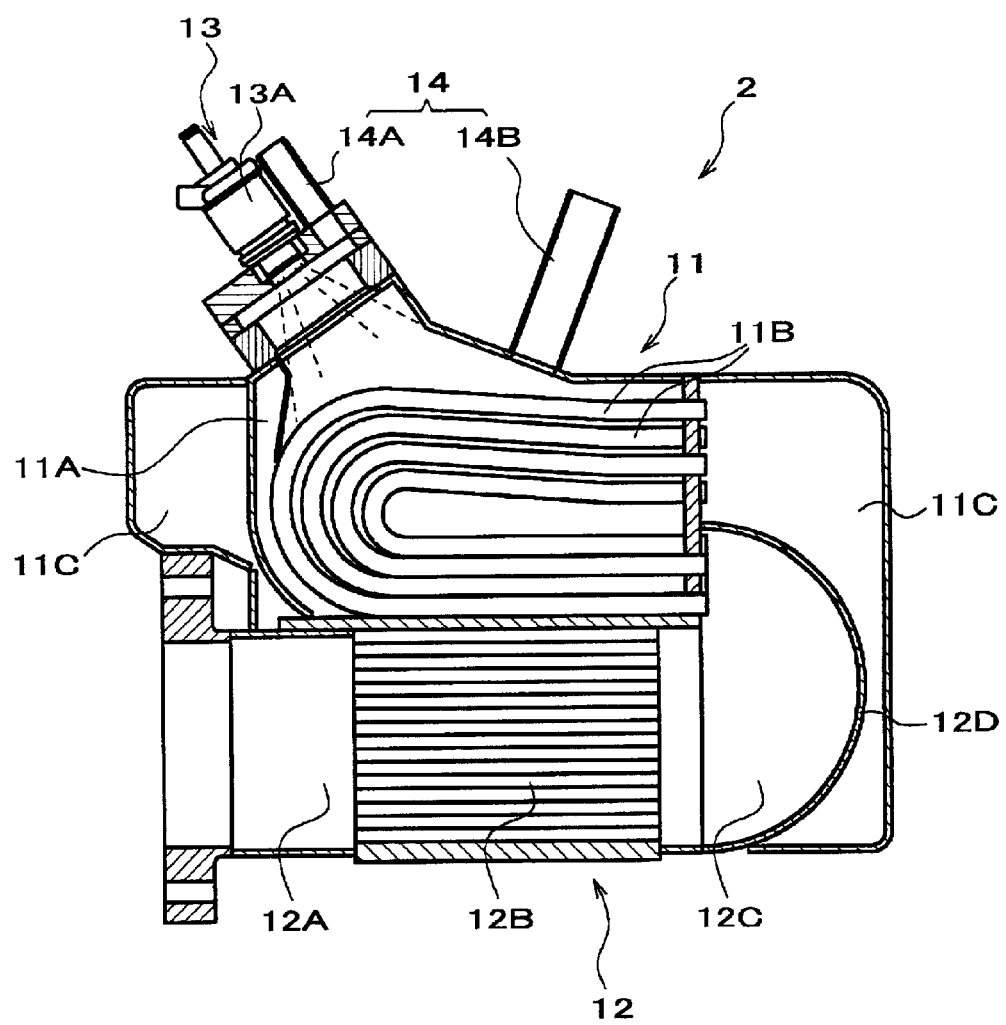
FIG. 2 is a side cross-sectional view showing an example of the evaporator.

The evaporator 2, for example, has a configuration shown in FIG. 2.

As shown in FIG. 2, an evaporation chamber 11A which evaporates the raw fuel liquid into the raw fuel gas is formed within the body 11 of the evaporator. A lot of U-shaped thermal medium tubes 11B, 11B, . . . within which the combustion gas serving as a high temperature medium flows, are provided within the evaporation chamber 11A. On the other hand, the raw fuel liquid is injected at the evaporation chamber 11A from the raw fuel-injecting apparatus 13 placed on an upper portion of the evaporation chamber 11A. The combustion gas flowing within the thermal medium tubes 11B, 11B, . . . renders the raw fuel liquid to the heat to thereby evaporate the raw fuel liquid.

The catalytic combustor 12 is disposed on a lower portion of the body 11 of the evaporator. On the catalytic combustor 12 are formed an inlet passage 12A into which the off gas, which is heated to become the combustion gas, flow, and a catalyst layer 12B is provided on the downstream of the inlet passage 12A. A honeycomb shaped carrier having a metallic catalyst component carried thereon makes up the catalyst layer 12B, and the off gas is combusted due to the catalytic reaction to produce the combustion gas.

On the downstream of the catalyst layer 12B, an outlet passage 12C is formed by means of a diagram 12D, and the combustion gas passes through the combustion gas. The catalyst layer 12B and the thermal medium tubes 11B, 11B, . . . in the body 11 of the evaporator are communicated with each other via the outlet passage 12C formed by the diaphragm 12D.

On the downstream of the thermal medium tubes 11B, 11B, . . . is formed a combustion gas passage 11C through which the combustion gas produced by evaporating the raw fuel liquid through the thermal medium tubes 11B, 11B, . . . . The combustion gas passage 11C is arranged so as to surround the circumference of the evaporation chamber 11A, and is communicated with a superheating portion (not shown). The superheating portion is provided on the downstream of the body 11 of the evaporator, and is formed in such a manner that the raw fuel gas evaporated in the evaporation chamber 11A is superheated by the combustion gas flowing via the combustion gas passage 11C.

The raw fuel injecting apparatus 13 and the air introduction member 14 are disposed each on an upper portion of the evaporation chamber 11A of the body 11 of the evaporator.

The raw fuel-injecting apparatus 13 possesses a plurality of, e.g., three, raw fuel injecting portions 13A (only one shown in FIG. 2), and the raw fuel liquid is injected from these raw fuel injecting portions 13A. The raw fuel injecting portion 13A is, for example, composed of an injector. By supplying electricity to a solenoid coil (not shown) provided on the injector, the valve of the injector is opened so as to inject the raw fuel liquid from the nozzle. Based on a signal for injecting the raw fuel liquid from the control unit CU shown in FIG. 1, electricity is supplied to the solenoid coil or breaks down to open or close the valve.

Furthermore, a number of the air introduction ports 14A (only one shown in FIG. 2) serving as the air introduction member 14 corresponding to the number of the raw fuel injecting portions 13A, for example, 3, are provided. The air as the reforming air is supplied from the air compressor 5 to respective air introduction ports 14A, and is supplied to the evaporation chamber 11A of the body 11 of the evaporator. Together with and well admixed with the raw fuel gas obtained by evaporating the raw fuel liquid, the air as the reforming air is supplied to the reformer 3. The reforming air is brought into contact with the reforming catalyst within the reformer 3 to promote the reforming reaction of the raw fuel gas.

Each of the air introduction ports 14A is provided so as to reside adjacent to each of the raw fuel injection portions 13A of the raw fuel-injecting apparatus 13. The air introduced from the air introduction port 14A is introduced toward a prescribed direction into the evaporation chamber 11A of the body 11 of the evaporator. The air generates an air current, which has an effect of dispersing the raw fuel liquid injected from the raw fuel injecting portions 13A, while finely dividing the fuel liquid into fine droplets. Furthermore, the air introduction ports 14A is configured so that the injection direction of the raw fuel liquid is set by the generated air.

The air introduction member 14 has also possesses a port 14B for introducing the air for starting (hereinafter referred to as "starting air introduction port 14B), which is the second air introduction member according to the present invention. Both the air introduction port 14A and the starting air introduction port 14B in the air introduction member 14 are connected to the air compressor 5 shown in FIG. 1. As shown in FIG. 1, a first control valve 7A is provided on a conduit 8A between the air introduction port 14A and the air compressor 5, and a second control valve 7B is provided on a conduit 8B between the starting air introduction port 14B and the air compressor 5. Both the first control valve 7A and the second control valve 7B are connected to the control unit CU and are controlled. The starting air introduction port 14B has a diameter larger than that of the air introduction port 14A. For this reason, a large amount of the air can be introduced from the starting air introduction port 14B in comparison with the air introduction port 14A.

The reformer 3 has a plurality of reforming catalysts, and allows the raw fuel gas obtained by evaporating the raw fuel liquid in the evaporator for coming into contact with the reforming catalyst to thereby produce fuel gas with a high hydrogen content by the reforming reaction. The reforming air used in the course of the reforming reaction in the reformer 3 is supplied from the evaporator 2 together with the raw fuel gas. The combustion gas obtained by the reforming reaction in the reformer 3 is then supplied to the CO remover 4.

In the CO remover 4, carbon monoxide contained in the fuel gas transferred from the reformer 3 is removed by the reaction between the carbon monoxide and oxygen in the present of a selective oxidation catalyst to be selectively oxidized into carbon monoxide. The fuel gas from which the harmful substance is removed is exhausted from the CO remover 4 and is supplied to the anode side of the fuel cell 1.

The air compressor 5 inhales the open air, and supplies it to the cathode side of the fuel cell 1. Furthermore, the air compressor 5 supplies the air for reforming to the air introduction member 14 provided on the evaporator 2. In addition, the air compressor 5 supplies the air to the CO remover for the removal of CO, which is harmful to the fuel cell 1.

Also, the off gas, which is the exhaust gas, is exhausted from the fuel cell 1. The off gas is exhaust both from the anode side and the cathode side of the fuel cell 1. From the anode side, the fuel gas remaining unused in the reaction is exhaust as anode side off gas. Also, from the cathode side of the fuel cell 1, the air having not used in the reaction is exhausted as cathode side off gas. Both the anode side off gas exhausted from the anode side of the fuel cell 1 and the cathode side off gas exhausted from the cathode side are supplied to the catalytic combustor 12 in the evaporator 2. Utilizing anode side off gas used as a fuel and the cathode side off gas as an oxidant gas in the catalytic combustor, the anode side off gas is combusted in the catalytic combustor 12 to obtain a heat.

The starting combustion burner 6 is used at the time of starting the fuel cell system FCS and at the time when no off gas has yet been produced from the fuel cell 1. From the starting combustion burner 6, the methanol fuel or such is supplied to the catalytic combustor 12. Subsequently, the fuel is catalytically combusted on the catalyst layer 12B (see FIG. 2) over the catalytic combustor 12 to increase the temperature of the catalyst layer 12B within a short period of time.

On a conduit 8C through which gas (hereinafter referred to as "mixed gas") comprising the raw fuel gas exhausted from the evaporator admixed with the reforming air flows is provided a first thermometer T1. The first thermometer T1 measures the temperature of the air exhausted from the evaporator 2 at the time of starting the fuel cell system FCS. Since the air exhausted from the evaporator 2 is increased or decreased corresponding to the temperature of the evaporator 2, the temperature of the air exhausted from the evaporator 2 can be deduced as the temperature of the evaporator 2. Then, a signal for the temperature of the evaporator based on the temperature of the mixed gas measured by the first thermometer T1, in other words, based on the temperature of the evaporator, is outputted from the first thermometer T1 to the control unit CU.

A second thermometer T2 comprising a thermocouple or a thermister is equipped with the reforming catalyst in the reformer 3 and measures the temperature of the reforming catalyst. A signal for the temperature of the reforming catalyst based on the temperature of the reforming catalyst measured by the second thermometer T2 is outputted from the second thermometer T2 to the control unit CU.

The control unit CU having an Electronic Control Unit ECU and the like performs various calculations. To the control unit CU are outputted the signal for the temperature of the evaporator based on the temperature of the evaporator measured by the first thermometer and the signal for the temperature of the reforming catalyst based on the temperature of the reforming catalyst measured by the second thermometer. The control unit CU calculates an amount of the raw fuel liquid to be injected, an amount of the air to be introduced into the evaporator 2, and the like, based on these temperature signals, the demand output from the fuel cell 1, and the like. Various signals based on the calculations are outputted to the raw fuel injecting portions 13A in the raw fuel-Injecting apparatus 13, the air introduction port 14A in the air introduction member 14, the control valves 7A and 7B, and the like.

The operation of the fuel cell system FCS having the configuration as described above will be described by referring to FIGS. 1 and 2.

First, the operation of the fuel cell system FCS at the timing of starting will be described.

Figure 3:
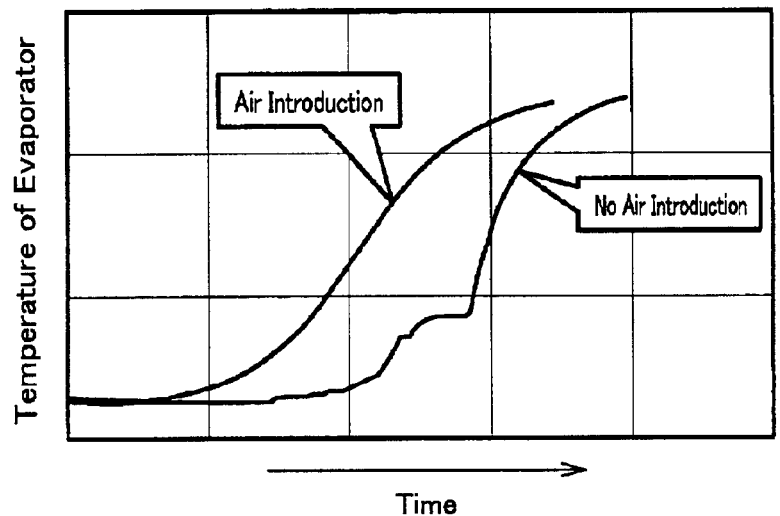
FIG. 3 is a graph showing the temperature change in the case of introduction of the air into the evaporator and the temperature change in the case of no introduction of the air into the evaporator.

At the time of starting the fuel cell system FCS, the evaporator 2 is left cooling, and the temperature of the reforming catalyst in the reformer 3 is also low. For this reason, the evaporator 2 should be warmed up and the temperature of the reforming catalyst in the reformer 3 should be increased. First, in order to warm up the evaporator, the methanol fuel is combusted in the starting combustion burner 6 to generate a high temperature gas, which is transferred into the thermal medium tubes 11B, 11B, . . . of the evaporator 2. At this time, the air supplied from the air compressor 5 is introduced from the starting air introduction ports 14B into the thermal medium tubes 11B, 11B, . . . in a relatively large amount. Since the air supplied into the evaporation chamber 11A of the evaporator 11 serves as the thermal medium, which takes away the heat from the thermal medium tubes 11B, 11B, . . . having been heated by the high temperature gas, and spread over the whole of the body 11 of the evaporator, the evaporator can be rapidly warmed up. Here, the temperature changes in cases where the air is introduced into the evaporator 2 and no air is introduced into the evaporator 2 are shown in FIG. 3. As is proven from FIG. 3, when the air is introduced in the evaporator 2, the temperature of the evaporator 2 is rapidly increased, while the increasing of the temperature of the evaporator 2 is delayed in the case where no air is introduced in the evaporator 2. As described above, the introduction of the air into the evaporator 2 allows for rapidly warming up the evaporator 2.

Figure 4:
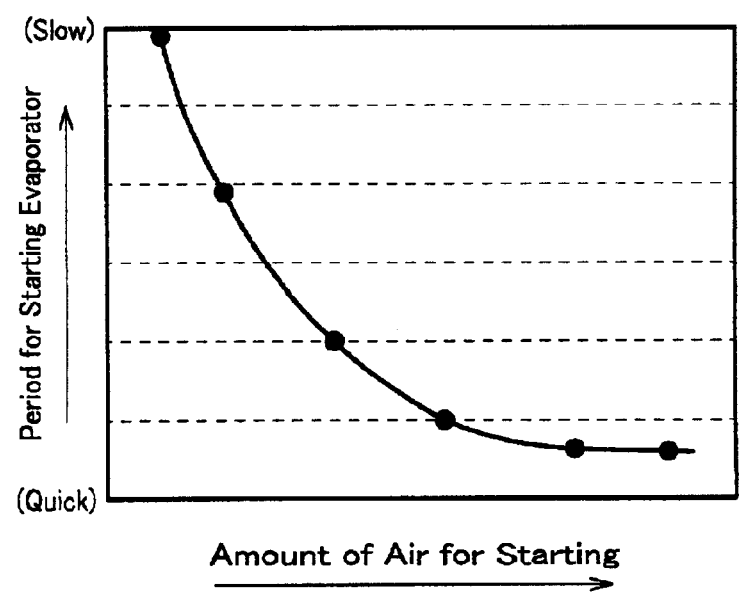
FIG. 4 is a graph showing the relation between the amount of the air introduced at the time of starting the fuel cell system and the period for starting the evaporator.

In order to rapidly warm up the evaporator 2, a given amount of the air is required. FIG. 4 shows the relation between the amount of the air introduced from the starting air introduction port 14B (hereinafter referred to as "amount of the air for starting") and the period until the evaporator 2 can be started (hereinafter referred to as "period for starting the evaporator"). As it can be understood from FIG. 4, if the amount of the air for starting is small, the period for starting the evaporator is slow. There is a tendency that the period for starting the evaporator becomes faster according to the increasing of the amount of the air for starting. For this reason, a large amount of the air is introduced at the time of starting the fuel cell system FCS.

The air having been used as the thermal medium to rapidly warm up the evaporator 2 is exhaust and transferred into the reformer 3 as it is. In the reformer 3, the reforming catalyst is heated by the air exhausted from the evaporator. For this reason, without using any starting combustion burner for heating the reforming catalyst in the reformer 3, the temperature of the reforming catalyst in the reformer 3 is increased. At the time which the temperature of the evaporator 2 or the temperature of the reforming catalyst in the reformer 3 becomes a prescribed temperature or more, the warming-up of the fuel cell system FCS is judged to be completed, and then the raw fuel gas is introduced.

At the time of the normal operation of the fuel cell system FCS, i.e., any operation except for the operation at the time of starting the fuel cell system FCS, the raw fuel liquid such as the water/methanol mixed liquid is supplied from the tank T to the raw fuel-injecting apparatus 13 in the evaporator 2. When the raw fuel liquid is injected, the air is introduced through the air introduction ports 14A in the air introduction member 14 into the evaporation chamber 11A of the body 11 of the evaporator in the evaporator 2. The flow amount of the air introduced from the air introduction ports 14A varies corresponding to the amount of the fuel gas, which varies depending upon the demand load to the fuel cell 1 and the like. In order to deal with the case of a small variation amount, the flow amount of the air to be introduced from the air introduction ports 14A cannot be too much. For this reason, in order to introduce a large amount of the air at the time of the starting, the starting air introduction ports 14B are separately provided. By providing the air introduction ports 14A and the starting air introduction ports 14B individually, the configuration to obtain a finely controlled flow amount of air and the configuration to introduce a large amount of air are provided, leading to simplified changing the air introduction manner in comparison with one air introduction manner.

As described above, the air introduced from the air introduction ports 14A generates current. Also, an appropriate amount of the raw fuel liquid is injected from the raw fuel injection portions 13A of the raw fuel-injecting apparatus 13. At this time, the raw fuel liquid injected from the raw fuel injection portions 13A is finely divided into small droplets by means of the air current occurring in the course of the introduction of the air from the air introduction ports 14A, and dispersed into the evaporation chamber 11A. The raw fuel liquid dispersed into the evaporation chamber 11A is uniformly sprayed onto the whole outer surfaces of the thermal medium tubes 11B, 11B, . . . through which the off gas flows, to be thereby effectively evaporated to give the raw fuel gas.

The raw fuel gas obtained in the evaporation chamber 11A is supplied from the evaporator 2 to the reformer 3. At this time, the reforming air introduced together with the raw fuel gas is also supplied from the evaporator 2 to the reformer 3. The reforming air introduced into the evaporator 2 is admixed with the raw fuel gas in a long area from the interior of the evaporator 2 to the interior of the conduit extending to the reformer 3 over a prolong period of time. For this reason, since the reforming air is well admixed with the raw fuel gas, the mixture of the raw fuel gas with the reforming air is in the state suitable for the reformation.

Figure 5:
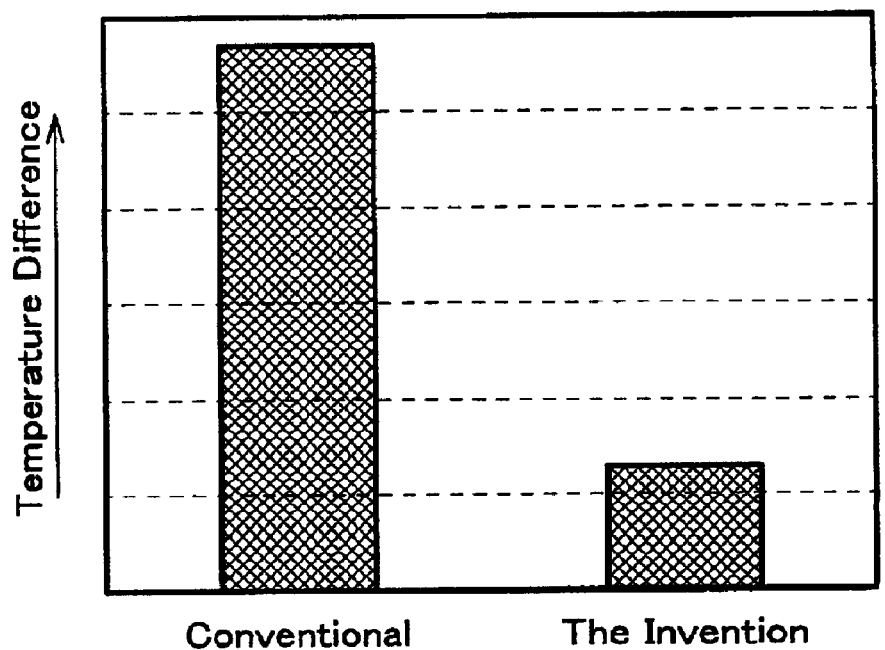
FIG. 5 is a graph showing the differences in the surface of the reforming catalyst in the prior art system and the present system.

Here, the temperature difference in the inventive case where the reforming air is introduced into the evaporator 2 will be compared with that in the conventional case where no reforming air is introduced into the evaporator 2. FIG. 5 is a graph showing the differences between the maximum surface temperature of the reforming catalyst and the minimum surface temperature thereof (referred to as "temperature difference in the surface") in the present invention (referred to as "the invention" in the figure) and in the conventional case (referred to as "conventional" in the figure). As is clear from FIG. 5, the temperature difference in the surface in the conventional case is approximately four times that in the present invention. As described above, the configuration of the present invention can reduce the temperature difference in the surface at a low level. Consequently, since the fuel cell system of the present invention can prevent the generation of uneven temperature of the surface of the reforming catalyst in the reformer 3, it can suppress the generation of unreformed gas (including the gas having been reformed only with insufficiently) (increasing of THC) and the increasing of the CO concentration.

Figure 6:
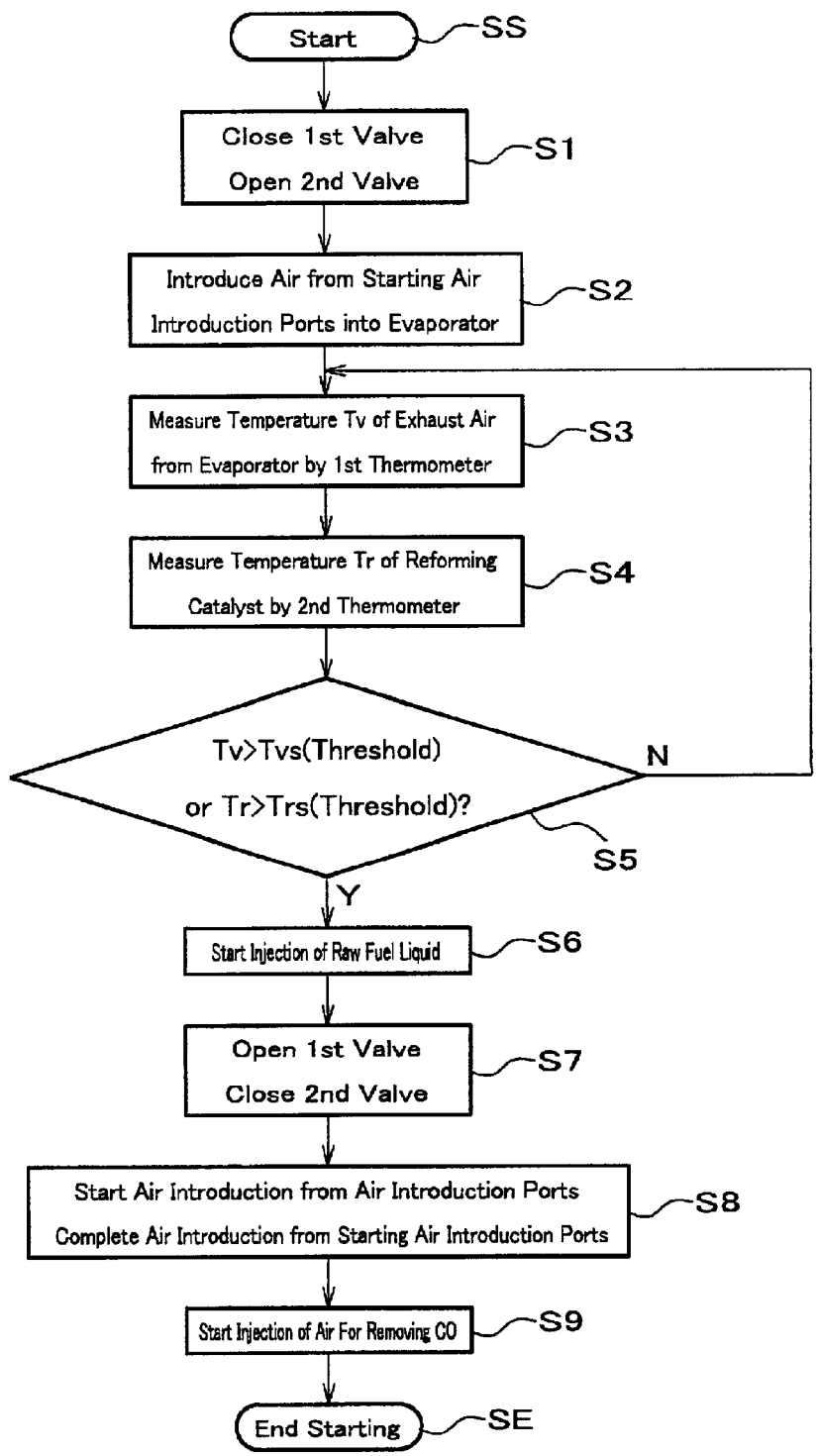
FIG. 6 is a flowchart showing the operation procedures for starting the fuel cell system according to the present invention.
Figure 7:
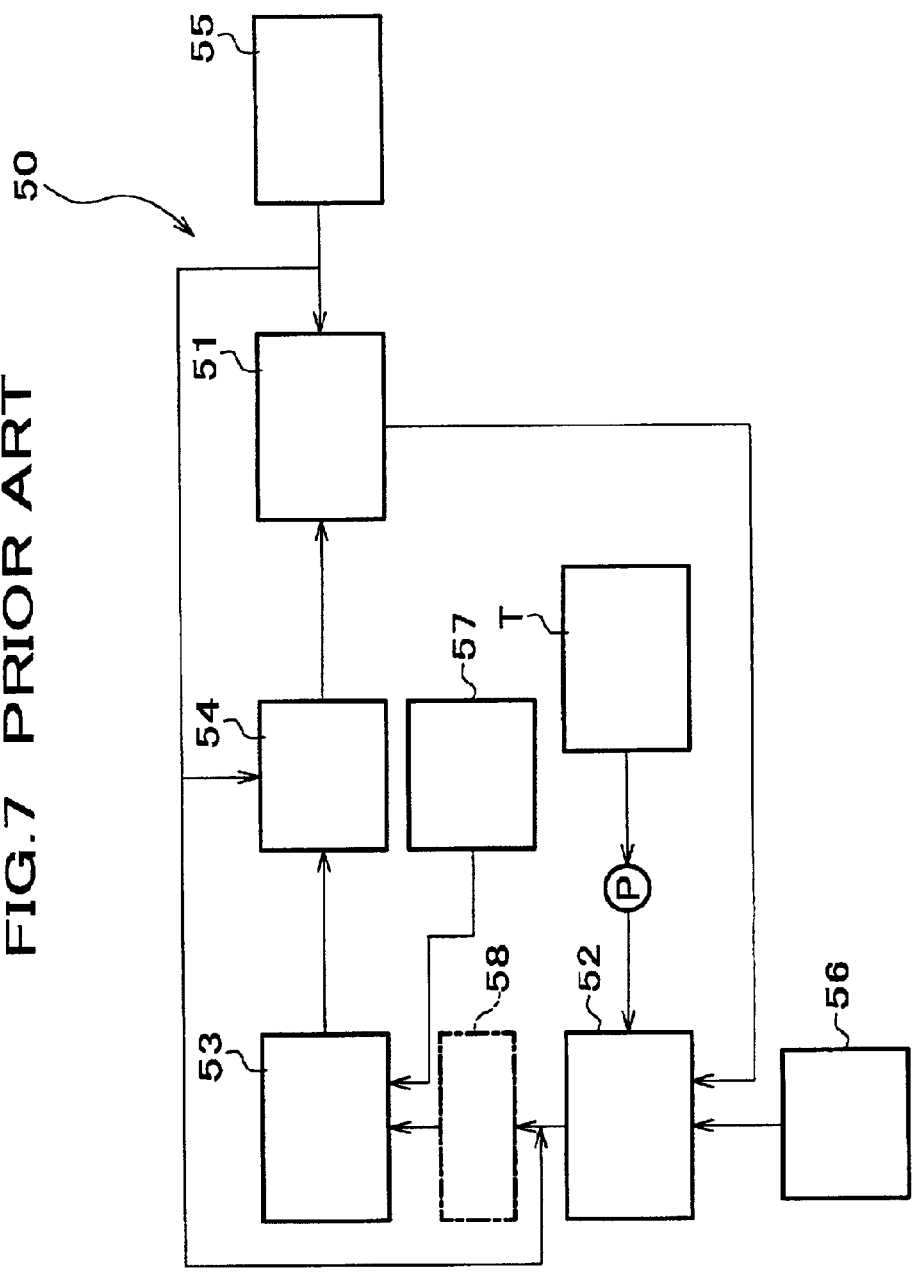
FIG. 7 shows a configuration of the conventional fuel cell system.
Figure 8:
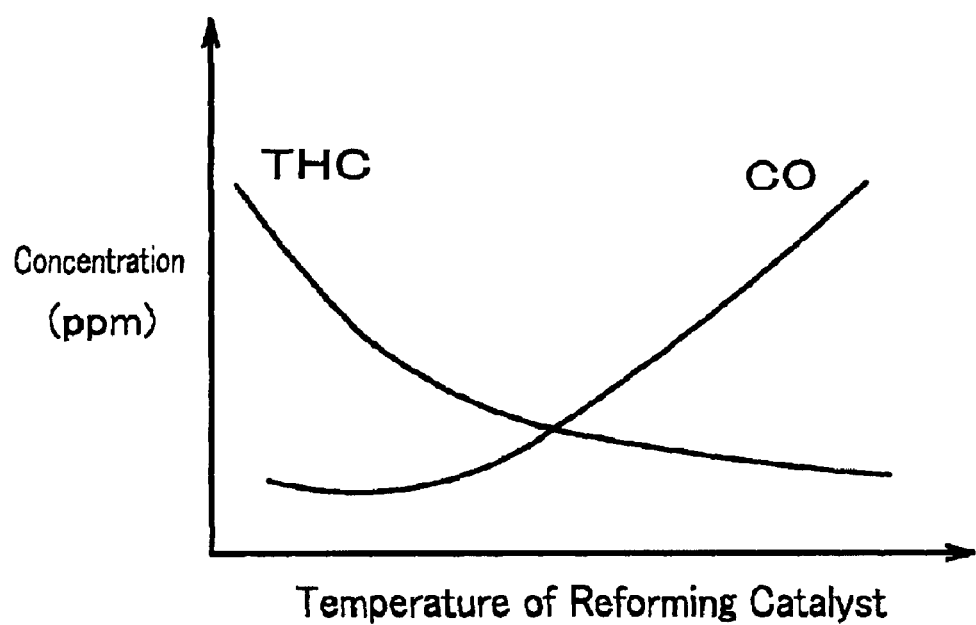
FIG. 8 is a graph showing the relation between the concentration of carbon monoxide in the fuel gas and the temperature of the reforming catalyst.

Next, operation procedures of starting the fuel cell system according to the present invention will be described by referring to the flowchart shown in FIG. 6.

When the fuel cell system FCS is started (SS), the methanol based fuel or such is supplied from the starting combustion burner 6 to the catalyst layer 12B of the evaporator 2. At the same time, the control unit CU outputs a closing signal to the first control valve 7A and an opening signal to the second control valve 7B (S1). Consequently, the air from the air compressor 5 is not supplied to the air introduction ports 14C, but supplied to the starting air introduction ports 14B. The air supplied to the starting air introduction ports 14B is then introduced into the evaporation chamber 14A of the body 11 of the evaporator (S2). At this time, the raw fuel liquid has not yet been injected from the raw fuel-injecting apparatus 13.

A large amount of the air has been introduced into the evaporation chamber 11A. For this reason, the catalyst combustor 12 can rapidly warm up the whole of the evaporator 2. As described above, the air introduced into the evaporator 3 has been utilized for the warming-up of the evaporator as the thermal medium, and then the air is exhausted from the evaporator 2 into the reformer 3 (the exhaust air from the evaporator), which is used as a heat source for increasing the temperature of the reforming catalyst. At this time, the temperature Tv of the exhaust air from the evaporator in the conduit 8C through which the exhaust air is passed in the course of the supply into the reformer 3 is measured by the first thermometer T1 (S3). The temperature Tv of the exhaust air from the evaporator measured by the first thermometer T1 is outputted to the control unit CU in which it is dealt as a signal for the temperature of the evaporator. On the other hand, the temperature Tr of the reforming catalyst in the reformer 3 is measured by the second thermometer T2 provided on the reforming catalyst of the reformer 3 (S4). The temperature Tr of the reforming catalyst measured by the second thermometer T1 is outputted to the control unit CU in which it is dealt as a signal for the temperature of the reforming catalyst.

The control unit CU judges whether or not the temperature Tv of the exhaust air from the evaporator exceeds a prescribed threshold value Tvs (S5). Also, the control unit CU judges whether or not the temperature Tr of the reforming catalyst exceeds a prescribed threshold value Trs. The threshold value Tvs and the threshold value Tvr can be suitably set. For example, the threshold value Tvs of the temperature Tv of the exhaust air from the evaporator may be a temperature which can sufficiently evaporate the raw fuel liquid within the evaporator 2. Also, the threshold value Trs of the temperature Tr of the reforming catalyst may be a temperature which can sufficiently carry out the reformation reaction.

If the temperature Tv of the exhaust air from the evaporator does not exceeds the threshold value Tvs and the temperature Tr of the threshold value Tvr as a result of the step S5, the step is returned to the step S3. Then, the temperature Tv of the exhaust air from the evaporator is measured by the first thermometer T1 and the temperature Tr of the reforming catalyst is measured by the second thermometer T2. On the other hand, if the temperature Tv of the exhaust air from the evaporator exceeds the prescribed threshold value Tvs or the temperature Tr of the reforming catalyst exceeds the prescribed threshold value Trs, the control unit CU judges that the fuel cell system FCS has been ready for carrying out the reformation reaction, and outputs the injection signal to the raw fuel-injecting apparatus 13.

The raw fuel-injecting apparatus 13 which has received the injection signal starts the injection of the raw fuel liquid from the raw fuel injection portions 13A towards the evaporation chamber 11A (S6). Simultaneously with outputting the injection signal, the control unit CU outputs an opening signal to the first control valve 7A and a closing signal to the second control valve 1B. Upon receiving the opening signal from the control unit CU, the first control valve 7A is opened, and the second control valve 7B outputted to the closing signal is closed (S7). By opening the first valve 7A, the air is introduced from the air introduction ports 14A into the evaporation chamber 11A in the body 11 of the evaporator. Due to the closing of the second control valve 7B, the introduction of the air from the starting air introduction ports 14B is stopped (S8). The air introduction ports 14A, which introduces the air into the evaporation chamber 11A only in a small amount, generates current by the air introduction. Each of the air introduction portions 14A is placed adjacent to each of the raw fuel injection portions 13A, and the raw fuel liquid injected from each of the raw fuel injection portions 14A is dispersed while it being finely divided into small droplets by the current generated by the introduction of the air. The finely divided, dispersed raw fuel liquid uniformly comes into contact with the thermal tubes 11B, 11B, . . . placed within the evaporation chamber 11A and, therefore, the evaporation of the raw fuel liquid is promoted. What is more, the amount of the air introduced corresponding to the injection amount of the raw fuel liquid Injected to the evaporation chamber 11A can be finely controlled.

The air introduced from the air introduction ports 14A is supplied from the evaporator 2 to the reformer 3 together with the raw fuel gas formed by the evaporation of the raw fuel liquid. The reformer 3 produces the hydrogen enriched fuel gas by bringing the raw fuel gas into contact with the reforming catalyst to carry out the reformation reaction. While the reforming air is required in the reformation reaction, the air supplied from the evaporator together with the raw fuel gas serves as the reforming air in the reformer 3. The reforming air to be supplied to the reformer 2 has been thoroughly admixed with the raw fuel gas in the course of being supplied from the evaporator 2 to the reformer 3. Accordingly, the temperature difference in the surface becomes small, suppressing the generation of unreformed gas (inclusive of imperfectly reformed gas) and increasing of the CO concentration.

As described above, after the introduction of the air from the air introduction ports 14A is started and the air introduction from the starting air introduction ports 14B is stopped, the introduction of the air for removing CO into the CO remover 4 is started (S9). As described above, the starting of the fuel cell system FCS is ended (SE). When the starting of the fuel cell system FCS is ended, the full-scaled operation of the fuel cell system FCS is started. Even after the full-scaled operation of the fuel cell system FCS has been started, the mixed gas having the reforming air admixed with the raw fuel gas is still supplied from the evaporator 2 to the reformer 3. For this reason, the temperature difference in the surface of the reforming catalyst can be reduced at a low level and, thus, the generation of the unreformed gas and the increasing of the CO concentration can be suppressed.

Next, the second embodiment of the present invention will now be described.

This embodiment has the same configuration as that of the first embodiment, except that the starting air introduction port 14B and accompanying parts such as the conduit 8B and the second control valve 7B are not provided.

In the fuel cell system FCS according to this embodiment, the operation procedures at the time of starting the fuel cell system FCS are different from those of the fuel cell system FCS according to the first invention. The operation procedures at the time of starting the fuel cell system FCS according to this embodiment, especially the procedures different from those in the first embodiment, will be described.

When the fuel cell system according to this embodiment is started, the methanol based fuel or such is supplied from the starting combustion burner to the catalytic combustor 12, and then air is introduced from the air introduction ports 14A into the evaporation chamber 11A in this embodiment, while the air introduction is carried out from the starting air introduction ports 14B in the first embodiment. Subsequently, as in the case of the first embodiment, the temperature Tv of the exhaust air from the evaporator is measured by the first thermometer T1, and the temperature Tr of the reforming catalyst is measured by the second thermometer T2. When the temperature Tv of the exhaust air from the evaporator exceeds the prescribed threshold value Tvs or the temperature Tr of the reforming catalyst exceeds the prescribed threshold value Trs, the first control valve 7A is come to a close to thereby stop the air introduction. Subsequently, the injection of the raw fuel liquid from the raw fuel-injecting apparatus 13 is started and, at the same time, the first control valve 7A is opened to start the air introduction from the air introduction ports 12A. Thereafter, the air for removing CO is introduced into the CO remover, the starting of the fuel cell system is stopped, and then full-scaled operation of the fuel cell system is started.

Comparing with the first embodiment, the fuel cell system according to the present invention, which requires no starting air introduction port, can be made into small size as the total system.

While the preferred embodiments of the present invention have been described, the present invention should not be restricted to such embodiments. For example, the starting air introduction port 14B has a diameter larger than that of the air introduction port 14A in the embodiment, the diameter of the starting air introduction port 14B may be substantially the same as or smaller than that of the air introduction port 14A. In such a case, for example, in order to a large amount of the air is introduced into the evaporator at the time of starting the fuel cell system, the air may be introduced both into the evaporator from the air introduction port and the starting air introduction port. It is of course possible that in the step for introducing the air from the starting air introduction port 14B according to the first embodiment, the air is also introduced from the air introduction port 14A.

Also, while the air introduced from the air introduction port 14A generates current, swirl current, zigzag current, deflected current or such may be generated for finely dividing the raw fuel into smaller droplets and dispersing it in a suitable manner.

Moreover, while the injection (supply) of the raw fuel liquid is started when the temperature of the evaporator or the temperature of the reforming catalyst exceeds a prescribed threshold value in these embodiments, in another preferred embodiment, the injection (supply) of the raw fuel liquid may be started after both of temperature of the evaporator or the temperature of the reforming catalyst exceeds respective threshold values.

What is claimed is:

1. A fuel cell system comprising:
   a fuel cell in which fuel gas and oxidant gas are supplied to generate power;
   an evaporator which evaporates raw fuel liquid by a combustion heat obtained by combusting exhaust gas exhausted from said fuel cell to provide raw fuel gas; and
   a reformer which reforms the raw fuel gas supplied from said evaporator to provide said fuel gas;
   said fuel cell system further comprising:
   an air introduction member which introduces air for use in the reforming reaction in said reformer; and
   the air introduced from said air introduction member being supplied from said evaporator to said reformer.

2. The fuel cell system according to claim 1, where said air introduction member introduces the air at the time of starting said fuel cell system.

3. The fuel cell system according to claim 2, wherein a second air introduction member is configured so as to introduce the air into the evaporator in an amount larger than that of said air introduction member.

4. The fuel cell system according to claim 3, wherein before the raw fuel gas is introduced into the evaporator and after the air introduction from the second air introduction member is started,
   air introduction from the second air introduction member is stopped when at least one of a signal for the evaporator temperature based on the temperature of the evaporator and a signal for the temperature of the reforming catalyst based on the temperature of the reforming catalyst exceeds a prescribed level, and the raw fuel liquid is supplied to the evaporator.

5. The fuel cell system according to claim 1, wherein before the raw fuel gas is introduced into the evaporator and after the air introduction from the air introduction member is started, the raw fuel liquid is supplied to the evaporator when at least one of a signal for the evaporator temperature based on the temperature of the evaporator and a signal for the temperature of the reforming catalyst based on the temperature of the reforming catalyst exceeds a prescribed level.

6. The fuel cell system according to claim 1, wherein said air introduction member comprises an air introduction port.

7. The fuel cell system according to claim 2, wherein before the raw fuel gas is introduced into the evaporator and after the air introduction from the second air introduction member is started,
   air Introduction from the second air introduction member is stopped when at least one of a signal for the evaporator temperature based on the temperature of the evaporator and a signal for the temperature of the reforming catalyst based on the temperature of the reforming catalyst exceeds a prescribed level, and the raw fuel liquid is supplied to the evaporator.

8. The fuel cell system according to claim 2, wherein said air introduction member comprises an air introduction port and a second air introduction member comprises an air introduction port.

9. The fuel cell system according to claim 8, wherein the diameter of said air introduction port is smaller than that of said second air introduction port.

10. A fuel cell system comprising:
    a fuel cell in which fuel gas and oxidant gas are supplied to generate power;
    an evaporator which evaporates raw fuel liquid by a combustion heat obtained by combusting exhaust gas exhausted from said fuel cell to provide raw fuel gas; and
    a reformer which reforms the raw fuel gas supplied from said evaporator to provide said fuel gas;
    said fuel cell system having a configuration that at the time of starting said fuel cell system, air is introduced into said evaporator in an amount larger than that at the time of the normal operation, and the larger amount of the air and the raw fuel liquid are admixed with each other in said evaporator, after which the air having been utilized for warming up said evaporator is transferred to said reformer.

* * * * *